United States Patent
Furuta et al.

(10) Patent No.: US 7,026,268 B2
(45) Date of Patent: Apr. 11, 2006

(54) SOLID ACID CATALYST CONTAINING PLATINUM GROUP METAL COMPONENT AND METHOD FOR PREPARATION THEREOF

(75) Inventors: Satoshi Furuta, Toda (JP); Minoru Ogawa, Toda (JP)

(73) Assignee: Japan Energy Corporation, Tokyo (JP)

( * ) Notice: Subject to any disclaimer, the term of this patent is extended or adjusted under 35 U.S.C. 154(b) by 162 days.

(21) Appl. No.: 10/468,925

(22) PCT Filed: Feb. 28, 2002

(86) PCT No.: PCT/JP02/01873

§ 371 (c)(1),
(2), (4) Date: Aug. 21, 2003

(87) PCT Pub. No.: WO02/070129

PCT Pub. Date: Sep. 12, 2002

(65) Prior Publication Data
US 2004/0067845 A1 Apr. 8, 2004

(30) Foreign Application Priority Data
Mar. 2, 2001 (JP) .............................. 2001-057840

(51) Int. Cl.
*B01J 27/053* (2006.01)
*B01J 27/043* (2006.01)
*B01J 27/045* (2006.01)
*C07C 15/00* (2006.01)
*C07C 5/22* (2006.01)

(52) U.S. Cl. ...................... 502/217; 502/222; 502/223; 585/407; 585/477; 585/671

(58) Field of Classification Search ................ 502/217, 502/222, 223; 585/407, 477, 671
See application file for complete search history.

(56) References Cited

U.S. PATENT DOCUMENTS 3,032,599 A  5/1962  Holm et al.
5,648,590 A * 7/1997  Hsu et al. ................... 585/751

(Continued)

FOREIGN PATENT DOCUMENTS

EP  1 142 636 A1  10/2001

(Continued)

*Primary Examiner*—J. A. Lorengo
*Assistant Examiner*—Patricia L. Hailey
(74) *Attorney, Agent, or Firm*—Flynn, Thiel, Boutell & Tanis, P.C.

(57) ABSTRACT

The present invention provides a concentration distribution for a platinum group metal component in a catalyst with which catalyst activity can be increased, and to provide a method for supporting a platinum group metal with which this concentration distribution can be achieved. The present invention is a solid acid catalyst that is made up of porous catalyst pellets exhibiting solid acid characteristics, and a platinum group metal component supported by these catalyst pellets, and that is used in an acid-catalyzed reaction, in which a quotient of dividing the standard deviation of the concentration in a platinum group metal component concentration distribution in the catalyst by an average concentration is 0.4 or less. The method for preparing this catalyst involves a step of preparing a support solution containing a platinum group metal as a cation, and a step of impregnating crystalline, porous catalyst pellets exhibiting solid acid characteristics with this support solution. The present invention also provides a method for isomerizing a hydrocarbon, wherein a solid acid catalyst is brought into contact with a hydrocarbon including at least 70 wt % of a saturated hydrocarbon component having 4 to 10 carbon atoms.

16 Claims, 3 Drawing Sheets

U.S. PATENT DOCUMENTS 6,107,235 A * 8/2000 Matsuzawa .................. 502/217
6,326,328 B1 * 12/2001 Matsuzawa .................. 502/217
6,420,305 B1 * 7/2002 Matsuzawa et al. ......... 502/222

FOREIGN PATENT DOCUMENTS

| | | |
|---|---|---|
| JP | 56033033 | 4/1981 |
| JP | 61068137 | 4/1986 |
| JP | 61068138 | 4/1986 |
| JP | 61153140 | 7/1986 |
| JP | 61153141 | 7/1986 |
| JP | 9038494 | 2/1997 |
| JP | 10195001 | 7/1998 |
| JP | 2000-044203 | 2/2000 |
| JP | 2000-233132 | 8/2000 |

* cited by examiner

SOLID ACID CATALYST CONTAINING PLATINUM GROUP METAL COMPONENT AND METHOD FOR PREPARATION THEREOF

TECHNICAL FIELD

The present invention relates to a method for supporting a platinum group metal component with which a solid acid catalyst having high activity in an acid-catalyzed reaction can be obtained, and to a solid acid catalyst obtained by this method.

BACKGROUND ART

Acid-catalyzed reactions such as alkylation, esterification, and isomerization are known in the chemical industry. Acid catalysts such as sulfuric acid, aluminum chloride, hydrogen fluoride, phosphoric acid, and paratoluenesulfonic acid have been used in these types of reactions in the past. However, a property of these acid catalysts is that they corrode metals, which has meant that the manufacturing equipment had to be made from expensive corrosion-resistant materials or subjected to an anti-corrosion treatment. Also, since in addition to the difficulty of separating the reaction substances after the reaction, a waste acid treatment was usually necessary, the process entailed complicated steps such as alkali washing, and caused a serious environmental problem. Furthermore, it was extremely difficult to recycle the catalyst.

In response to these problems, there has been proposed a sulfuric acid group-containing solid acid catalyst obtained by bringing a hydrated oxide or hydroxide of a metal from Group IV of the Periodic Table into contact with a sulfuric component-containing solution, then calcining at 350 to 800° C. (Japanese Patent Publication 59-6181). This solid acid catalyst exhibits a higher acid strength than 100% sulfuric acid (the Hammet acidity function $H_0$ is −11.93). Because of its high acid strength, this solid acid catalyst provides good catalyst performance in a wide variety of acid-catalyzed reactions, and furthermore has low corrosivity, separation of reaction substances is easy, there is no need for waste acid treatment, and the catalyst can be recycled. As such, this catalyst is expected to supplant conventional acid catalysts in many kinds of industrial reactions.

It is already known that a catalyst comprising platinum added to a catalyst obtained by calcining a zirconia gel containing a sulfuric component exhibits good activity in hydrocarbon isomerization reactions (U.S. Pat. No. 3,032,599). As for methods for preparing a metal oxide catalyst containing a platinum group metal and a sulfuric component, which are intended primarily for the isomerization of hydrocarbons, a manufacturing method that omits the calcining between the treatment with a sulfuric component-containing compound and the step of supporting a platinum group metal, a manufacturing method in which the order of the treatment with a sulfuric component-containing compound and the supporting of a platinum group metal is reversed, and a manufacturing method in which the type of sulfuric component-containing compound is changed have been disclosed in Japanese Patent Publications 5-29503, 5-29504, 5-29505, and H5-29506. A method for preparing a platinum-containing zirconia sulfate shaping has been disclosed in Japanese Laid-Open Patent Application 9-38494.

DISCLOSURE OF THE INVENTION

However, supporting the platinum on the catalyst was accomplished by impregnation with a support solution comprising a chloroplatinic acid aqueous solution, and there-has been no particular discussion of the concentration distribution of the platinum group metal in this catalyst up to now, nor has it been known what distribution would be best for raising catalyst activity. It is an object of the present invention to provide a concentration distribution for a platinum group metal component in a catalyst with which catalyst activity can be increased, and to provide a method for supporting a platinum group metal with which this concentration distribution can be achieved.

As a result of diligent research into the distribution of the platinum group metal component in a solid acid catalyst, the inventors discovered that the concentration is higher around the outer periphery or is nonuniform in catalyst cross section in the concentration distribution of a platinum group metal component produced by a conventional preparing method, and perfected the present invention upon realizing that catalyst activity could be increased by making this distribution uniform.

The solid acid catalyst containing a platinum group metal component pertaining to the present invention is a solid acid catalyst that comprises porous catalyst pellets exhibiting solid acid characteristics, and a platinum group metal component supported by these catalyst pellets, and that is used in an acid-catalyzed reaction, in which a quotient of dividing a standard deviation of concentration in the platinum group metal component concentration distribution in the catalyst by an average concentration is 0.4 or less. It is preferable if the platinum group metal component has been crystallized. It is also preferable if the catalyst pellets are composed of a shaped support consisting of a metal oxide, and a sulfurous component supported by this support. Further, as the metal component, the support preferably includes zirconium in an amount of 20 to 72 wt % as elemental zirconium weight in the catalyst. This solid acid catalyst can be used to advantage in the isomerization of hydrocarbons containing a saturated hydrocarbon component having 4 to 10 carbon atoms, preferably a saturated hydrocarbon component having 4 to 6 carbon atoms, in an amount of at least 70 wt %. "Metal oxide" as used in this Specification is defined as encompassing hydrated metal oxides.

The method for preparing a solid acid catalyst pertaining to the present invention comprises a step of preparing a support solution containing a platinum group metal as a cation, and a step of impregnating crystalline, porous catalyst pellets exhibiting solid acid characteristics with this support solution. Preferably, the catalyst pellets are produced by a step of supporting a sulfureous component on a shaped support consisting of a metal oxide, and the support solution contains an ammine complex of a platinum group metal.

If chloroplatinic acid, which forms a platinum group metal anion, is used as the support solution of a platinum group metal and the catalyst pellets are impregnated with the support solution, the capillary action of pores of the porous support will cause the concentration of platinum group metal to be higher in the center portion of the pellets, but the subsequent calcining will result in considerable local variance in the concentration of the platinum group metal. The reason for this seems to be that there is no interaction between the anions and the acidic activity points within the catalyst pellets, so the concentration distribution of the platinum group metal tends to vary during drying and calcining. With the present invention, when the platinum group metal is present as cations in impregnation, it selectively reaches the acidic activity points within the catalyst pellets, and the platinum group metal concentration becomes higher around the outer part of the catalyst. Drying and calcining then result in a uniform distribution of the platinum group metal. This uniform support of the platinum group metal increases catalyst activity.

Solid Acid Catalyst

The solid acid catalyst of the present invention comprises porous catalyst pellets exhibiting solid acid characteristics, and a platinum group metal component supported by these catalyst pellets, and that is used in an acid-catalyzed reaction, wherein the quotient (hereinafter also referred to simply as the standard deviation/average) of dividing the standard deviation of the concentration in the platinum group metal component concentration distribution in said catalyst by the average concentration is 0.4 or less. It is preferable if the catalyst pellets that exhibit solid acid characteristics are crystalline and porous.

The catalyst of the present invention is in a shaped form known as pellets, rather than a powder, and pellets 0.5 to 20 mm in size can be easily obtained. Usually, those with an average size of 0.5 to 20 mm, and particularly 0.6 to 5 mm, can be used to advantage. The mechanical strength of the catalyst, in terms of the side crushing strength of cylindrical pellets with a diameter of 1.5 mm, is at least 2 kg, and preferably at least 3 kg, and even more preferably 4 to 8 kg.

The catalyst pellets of the present invention preferably include a shaped support consisting of a metal oxide. There are no particular restrictions on the metal component of this metal oxide (including a hydrated metal oxide), but examples include boron, magnesium, aluminum, silicon, phosphorus, calcium, titanium, vanadium, chromium, manganese, iron, cobalt, nickel, copper, zinc, gallium, germanium, yttrium, zirconium, niobium, molybdenum, tin, hafnium, tungsten, lanthanum, and cerium. Aluminum, silicon, titanium, manganese, iron, yttrium, zirconium, molybdenum, tin, hafnium, and tungsten are preferred, and aluminum, titanium, iron, zirconium, and tin are particularly favorable. These metal oxides can be used singly or in mixtures, and can also be used in the form of a composite metal oxide such as a zeolite.

At least part of the metal component of the metal oxide used in the support of the present invention is preferably zirconium, and the zirconium content in the catalyst is preferably 20 to 72 wt %, and more preferably 30 to 60 wt %, as elemental zirconium weight. Also, at least part of the metal component of the metal oxide used in the support of the present invention is preferably aluminum, and the aluminum content in the catalyst is preferably 5 to 30 wt %, and more preferably 8 to 25 wt %, as elemental aluminum weight. It is particularly favorable that the solid acid catalyst of the present invention contains zirconium and aluminum as metal components, and a halogen can be further contained as needed in order to enhance the acid catalyst performance of the product.

It is preferable that the catalyst pellets of the present invention contain a sulfureous component. The proportion of the catalyst accounted for by the sulfureous component ($SO_4$) is 0.7 to 7 wt % as elemental sulfur weight, and preferably 1 to 6 wt %, and even more preferably 2 to 5 wt %. Catalyst activity will decrease if the content of the sulfureous component is either too large or too small.

One or more metals selected from among platinum group metals are contained in the solid acid catalyst of the present invention. Example of the platinum group metals referred to here include platinum, palladium, ruthenium, rhodium, iridium, and osmium. Platinum, palladium, and ruthenium are preferable, and the use of platinum is particularly favorable.

It is preferable for the platinum group metal to have been crystallized. The platinum group metal being crystallized means that there is a clear diffraction peak for a platinum group metal as measured by powder X-ray analysis. If we let 100% be the surface area of a diffraction peak produced by fully crystallized platinum, then the crystallization of the platinum group metal is confirmed by the appearance of a peak with a surface area of at least 30%, and particularly at least 50%, at the same position (hereinafter, the degree of crystallization is referred to as "crystallinity").

The proportion of the catalyst accounted for by the platinum group metal component (the average platinum group metal component concentration) is 0.01 to 10 wt %, and preferably 0.05 to 5 wt %, and especially 0.1 to 2 wt %, as the elemental metal weight. It is undesirable for the platinum group metal component content to be too low because the improvement in catalyst performance will be small. It is also undesirable for the platinum group metal component content to be too high because it will lower the specific surface area and pore volume of the catalyst.

The quotient of dividing the standard deviation of the concentration of the platinum group metal component concentration in the catalyst pertaining to the present invention by the average concentration is 0.4 or less, and preferably 0.3 or less. This value can be obtained by dividing up a line that passes through the center of the catalyst cross section (such as a line corresponding to the diameter in the case of a circular cross section) into at least 50 segments and finding the average concentration in each segment, and the standard deviation of the measured concentrations. The concentration distribution of the platinum group metal component can be found as the concentration of the platinum group metal component in the catalyst cross section from the measurement of X-ray intensity using an EPMA measurement apparatus. The crystallite diameter of the platinum group metal measured by X-ray diffraction is 10 nm or less, with 1 to 10 nm being particularly favorable. The platinum group metal concentration will tend to be uniform if the platinum group metal component is contained in an amount of at least 0.15 wt %, and particularly at least 0.2 wt %, and especially at least 0.3 wt %.

The specific surface area of the solid acid catalyst of the present invention is 50 to 500 $m^2/g$, with 100 to 300 $m^2/g$ being preferable, and 140 to 200 $m^2/g$ being particularly favorable. The specific surface area can be measured by the commonly known BET method. The pore structure of the solid acid catalyst of the present, invention can be analyzed by a nitrogen adsorption method for pore diameters ranging from 0.002 to 0.05 μm, and by mercury porosimetry for pore diameters ranging from 0.05 to 10 μm. The pore volume at a pore diameter of 0.002 to 10 μm is at least 0.2 $cm^3/g$, with at least 0.3 $cm^3/g$ being preferable, and 0.35 to 1.0 $cm^3/g$ being particularly favorable.

Catalyst Preparation Method

The method for preparing a solid acid catalyst of the present invention comprises a step of preparing a support solution containing a platinum group metal as a cation, and a step of impregnating crystalline, porous catalyst pellets exhibiting solid acid characteristics with this support solution. There are no particular restrictions on the support solution as long as it contains a platinum group metal as a cation, but one that contains an ammine complex of a platinum group metal is preferred. This ammine complex can be dichlorotetraammine platinum, tetrachlorohexaammine platinum, or the like. Platinum, palladium, ruthenium, and the like are favorable as the metal component selected as the platinum group metal component, and platinum can be used to particular advantage. The platinum group metal component may also include a metal component from another group. It is preferable to add these metal compounds such that the total amount of the platinum group metal component in the solid acid catalyst is 0.01 to 10 wt %, with 0.1 to 5 wt % being preferable, and 0.15 or higher being particularly favorable. The pH of the support solution should be 5 to 8, with 6 to 7.5 being particularly good. Outside this range there will be a relative decrease in catalyst activity.

There are no particular restrictions on how the impregnation with the support solution is accomplished, but methods that can be used include spraying and dipping. After impregnation, the support solution is usually stabilized by drying, calcining, or the like. The calcining temperature will vary with the calcining time and other calcining conditions, but is generally 300 to 800° C., with 400 to 800° C. being particularly good, and 500 to 700° C. being even better. The calcining time will vary with the calcining temperature and other calcining conditions, but is generally 0.05 to 20 hours, with 0.1 to 10 hours being particularly good, and 0.2 to 5 hours being even better. It is preferable for the calcining to be performed at the same or higher temperature as in the calcining or other such heat treatment carried out in the preparation of catalyst pellets. The drying and calcining may be conducted in a gas atmosphere of air, nitrogen, or the like, but it is more desirable that it be conducted in air. Reduction is preferably performed in a gas flow containing hydrogen.

There are no particular restrictions on the method for preparing the porous catalyst pellets exhibiting solid acid characteristics, but an example is a method in which a sulfur-containing compound is added to and kneaded with a powder of a hydrated metal oxide and/or a metal hydroxide, which is a powder that becomes a precursor of the metal oxide that makes up the support (hereinafter referred to as "precursor powder"), and this mixture is then shaped and calcined. This method will be used for the following description, but the order of the calcining of the support, the supporting of the sulfureous component, and so forth can be changed as needed.

Precursor Powder

The precursor powder, which becomes the metal oxide constituting the support by calcining after shaping, can be prepared in any way desired, but it can generally be obtained by neutralizing or hydrolyzing a metal salt or organometal compound, then washing and drying. This precursor powder can be a mixture of two or more kinds of powder. This precursor powder can also be a composite metal hydroxide and/or composite metal hydrate oxide.

Sulfur-containing Compound

The sulfur-containing compound is a compound containing sulfureous component, or a compound containing sulfur that can be subsequently converted into a sulfureous component by calcining or another such treatment. Examples of sulfur-containing compounds include sulfuric acid, ammonium sulfate, sulfurous acid, ammonium sulfite, thionyl chloride, and dimethylsulfuric acid, but the use of a sulfureous component-containing compound is preferable, and ammonium sulfate and dimethylsulfuric acid are favorable because of their low corrosivity to the preparing equipment. The use of ammonium sulfate is best of all.

The sulfur-containing compound may be used just as it is, or in the form of a solution, such as an aqueous solution. The sulfur-containing compound may be in the form of a solid or a liquid, and there are no particular restrictions on the concentration of the solution, which can be prepared by taking into account such factors as the amount of solution needed for kneading. It is preferable to add the sulfur-containing compound such that the amount of the sulfureous component ($SO_4$) in the ultimately obtained solid acid catalyst be 1 to 10 wt %, and preferably 1.5 to 9 wt %, and particularly 2 to 8 wt %, as the elemental sulfur weight.

Kneading

There are no particular restrictions on the kneading method, and any kneader commonly used in the preparation of catalysts can be employed. A method in which the raw material is put into a kneader, and water is added and mixed with an agitation impeller can usually be used to advantage, but there are no particular restrictions on the order in which the raw materials and additives are introduced and so forth. Water is usually added during kneading, but the added liquid may instead be ethanol, isopropanol, acetone, methyl ethyl ketone, methyl isobutyl ketone, or another organic solvent. The kneading temperature and time will vary with the hydrated metal oxide and/or metal hydroxide precursor powder and sulfur-containing compound as the raw materials, but there are no particular restrictions as long as the conditions allow a favorable pore structure to be obtained. Similarly, as long as the catalyst properties of the present invention are maintained, an acid such as nitric acid, a base such as ammonia, an organic compound, a metal salt, ceramic fibers, a surfactant, a zeolite, clay, or the like may also be added and kneaded.

Shaping

There are no particular restrictions on the shaping method employed after kneading, and any shaping method commonly employed in the preparation of catalysts can be used. Extrusion shaping using a screw extruder or the like is particularly favorable because it allows the material to be efficiently shaped into pellets, a honeycomb shape, or other desired shape. There are no particular restrictions on the size of the shaped product, but the cross sectional length thereof is usually 0.5 to 20 mm. For instance, cylindrical pellets with a diameter of 0.5 to 10 mm and a length of about 0.5 to 15 mm can usually be obtained with ease.

Calcining After Shaping

The calcining performed after shaping is conducted in a gas atmosphere of air, nitrogen, or the like, but it is especially favorably conducted in air. The calcining temperature will vary with the calcining time, the gas flux, and other calcining conditions, but is generally 400 to 900° C., and preferably 500 to 800° C. The calcining time will vary with the calcining temperature, the gas flux, and other calcining conditions, but is generally 0.05 to 20 hours, with 0.1 to 10 hours being preferable, and 0.2 to 5 hours being particularly favorable.

Application to Reaction

The acid-catalyzed reactions to which the solid acid catalyst pertaining to the present invention is applied include acid-catalyzed reactions which in the past made use of a Lewis acid catalyst, typified by an aluminum chloride-based catalyst, or a Broensted acid catalyst, typified by sulfuric acid. The catalyst of the present invention can be used to advantage in a wide range of reactions, especially isomerization, disproportionation, nitration, decomposition, alkylation, esterification, acylation, etherification, rearrangement, polymerization, and so forth. Specific examples in which the catalyst of the present invention can be used include the isomerization of light naphtha, isomerization of a wax, isomerization of an olefin, isomerization of xylene, disproportionation of toluene, nitration of an aromatic compound, decomposition of fluorocarbons, decomposition of cumene hydroperoxide, alkylation of butene and butane, alkylation of an aromatic compound, esterification of methacrylic acid and the like, esterification of phthalic anhydride, acylation of an aromatic compound, etherification of isobutene and methanol, Beckmann rearrangement, ring-opening polymerization of tetrahydrofuran, polymerization of an olefin, and oxidative coupling of methane. The use of the catalyst of the present invention is favorable in the isomerization of hydrocarbons including at least 70 wt % saturated hydrocarbon component having 4 to 10 carbon atoms, and particularly 4 to 6 carbon atoms.

Hydrocarbon Used in Isomerization Reaction

There are no particular restrictions on the hydrocarbon that serves as the raw material of the isomerization reaction of the present invention, but the hydrocarbons in a petroleum fraction whose boiling point is between −20° C. and 250° C., and particularly between −20° C. and 150° C., can be used favorably. It is preferable to use hydrocarbons in which saturated hydrocarbons having 4 to 6 carbon atoms account for at least 70 wt %, and particularly at least 90 wt %, of the total. A favorable reaction is one in which a straight-chain paraffin is isomerized into a branched paraffin, or an olefin or an aromatic compound is hydrogenated into a linear or cyclic paraffin, and then further isomerized. As to the reaction conditions for the isomerization of hydrocarbon compounds, the preferred reaction temperature range is from 20 to 300° C., and particularly 100 to 250° C., the preferred reaction pressure range is from 1 to 50 kgf/cm$^2$, the preferred LHSV range is from 0.2 to 10/hr, and the preferred hydrogen/raw material ratio is given so as to provide at least the amount of hydrogen needed to saturate the unsaturated component (olefin component, aromatic component) included in the raw material hydrocarbon, and particularly from 0.01 to 10 mol/mol.

If the amount of benzene included in the hydrocarbon serving as the raw material is at least 0.5 wt %, and particularly 2 to 20 wt %, it is preferable to use a solid acid catalyst pertaining to the present invention in which the total amount of platinum group metal component accounts for 0.15 to 5 wt %, and preferably 0.2 to 4 wt %, and even more preferably 0.3 to 3 wt %, of the solid acid catalyst. If the platinum group metal content is lower than this range, the benzene that is present will hinder the isomerization of the linear or cyclic paraffin, resulting in a relative decrease in the conversion of hydrocarbons.

The amount in which the sulfur compound is contained in the hydrocarbon serving as the raw material in the isomerization reaction of the present invention is preferably no more than 500 ppm, and preferably no more than 100 ppm, and particularly no more than 1 ppm, as the sulfur weight. The amount of water in the hydrocarbon serving as the raw material in the isomerization reaction of the present invention is preferably no more than 100 ppm, and preferably no more than 5 ppm, and particularly no more than 1 ppm.

BEST MODE FOR CARRYING OUT THE INVENTION

Figure 1:
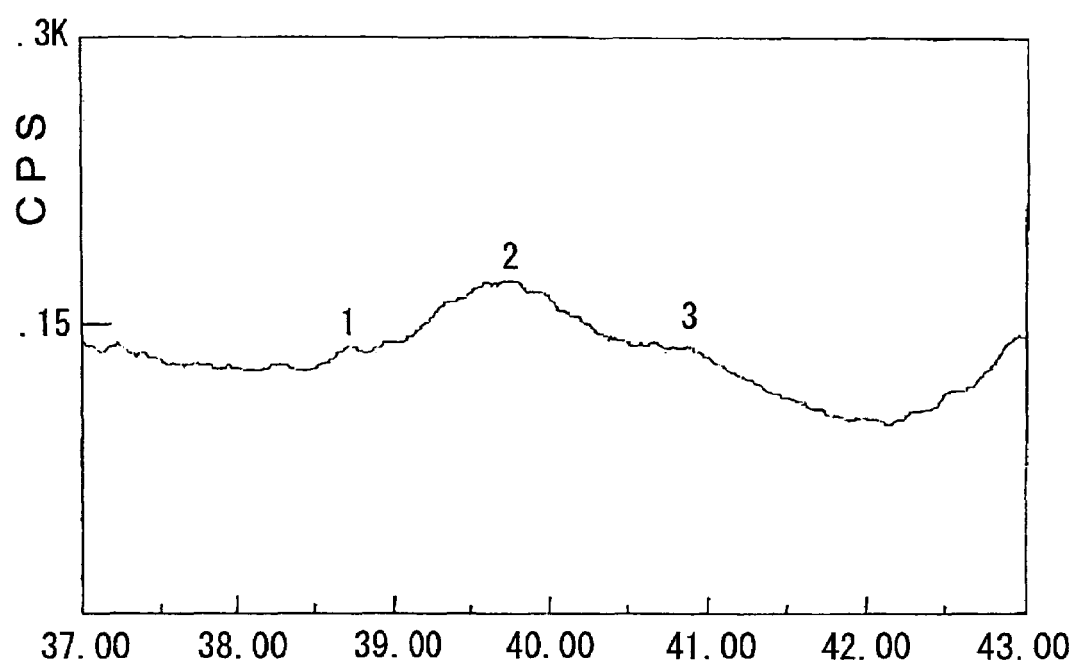
FIG. 1 is the X-ray diffraction pattern of catalyst A obtained in Example 1.

Following is a more detailed description through examples.

Method of Measuring Mean Particle Size of Agglomerate of Particles

Measurement was carried out by a wet measurement method using a Microtrac particle size analyzer made by Nikkiso Co., Ltd. With this method, the powder is dispersed in water, a laser beam is irradiated onto the flowing agglomerated particles, and particle size analysis is carried out using the forward-scattered light.

Method of Measuring Pore Structure

The specific surface area and the pore structure for a pore diameter range of 0.002 to 0.05 μm were measured by a nitrogen adsorption method using an ASAP 2400 measuring apparatus made by Micromeritics. For a pore diameter range of 0.05 to 10 μm, measurement was carried out by mercury porosimetry using an AutoPore 9200 measuring apparatus made by Micromeritics.

Method of Measuring Mean Crushing Strength

The side crushing strength was measured using a sample obtained by extruding into a cylindrical shape, drying and calcining, using a tablet crushability tester "TH-203CP" made by Toyama Sangyo Co., Ltd. A measuring probe having a circular tip of diameter 4.5 mm was used. The operation of carrying out measurement by pushing the measuring sample against the center of the side of the cylindrical sample was repeated 20 times, and the mean was calculated.

Analysis of Platinum Component Distribution by EPMA

The platinum concentration was measured at approximately 150 points at intervals of 10 μm in the radial direction of the catalyst cross section using an EPMA measurement apparatus. The concentration was calculated as follows. The X-ray intensity at the peak of the characteristic X-ray for the platinum group metal was measured as well as the X-ray intensities at the background positions ahead of and behind the peak, the background value was determined at the peak position, the background was subtracted from the measured intensity at the peak position, and this remainder was termed the true intensity. Measurement with the EPMA apparatus was conducted under the following conditions using an EPMA JXA8900R made by JEOL Ltd.

Acceleration voltage: 20 kV
Sample current: 0.1 μA
Beam diameter: 10 μmφ
Spectroscopic crystal: LiF
Measurement energy position (with platinum)
PtLα (peak position): 9.441 keV
background position: 8.768 keV, 9.817 keV Catalyst Pellets A A powder with an average particle size of 1.5 μm and produced by drying commercially available dry zirconium hydroxide was used as a hydrated zirconia powder. A commercially available pseudo-boehmite powder with an average particle size of 10 μm was used as a hydrated alumina powder. 1860 g of this hydrated zirconia powder and 1120 g of hydrated alumina powder were added, 575 g of ammonium sulfate was further added, and the components were kneaded for 45 minutes in a kneader equipped with agitating blades while water was added. The kneaded product was extruded from an extruder having a circular opening 1.6 mm in diameter, which formed cylindrical pellets, and these were dried at 110° C. to obtain dry pellets. A portion of these dry pellets was then calcined for 1.5 hours at 657° C. to obtain catalyst pellets A.

These shaped catalyst pellets A were cylindrical, with an average diameter of 1.4 mm and an average length of 4 mm, and their average crushing strength was 4.2 kg. The proportion of zirconia in the catalyst pellets A was 45.4 wt % as the elemental zirconium weight, the proportion of alumina was 14.7 wt % as the elemental aluminum weight, the proportion of sulfureous component was 3.0 wt % as the elemental sulfur weight, and the proportion of nitrogen was no more than 0.01 wt %. The specific surface area of the catalyst pellets A was 165 m$^2$/g, the pore volume of pores with a diameter of 0.002 to 10 μm was 0.32 mL/g, and the median pore diameter in a pore diameter range of 0.002 to 0.05 μm of the catalyst pellets A was 54 Å.

EXAMPLE 1

An aqueous solution (pH 7.0) of dichlorotetraammine platinum (($NH_3$)$_4$$PtCl_2$) was supported on 125 g of Catalyst Pellets A by spraying such that the amount of platinum in the catalyst would be 0.5 wt %. This product was dried, then calcined for 0.5 hour at 680° C. to obtain approximately 125 g of Catalyst A (MO-567).

EXAMPLE 2

Catalyst B (MO-673) was obtained in the same manner as in Example 1, except that the amount of platinum in the catalyst was changed to 0.33 wt %.

Comparative Example 1

Catalyst C (MO-599) was obtained in the same manner as in Example 1, except that the amount of platinum in the catalyst was changed to 0.11 wt %.

EXAMPLE 3

Catalyst D (MO-631) was obtained in the same manner as in Example 1, except that hydrochloric acid was added to the aqueous solution of dichlorotetraammine platinum to adjust the pH of the support solution to 1.8.

EXAMPLE 4

Catalyst E (MO-630) was obtained in the same manner as in Example 1, except that aqueous ammonia was added to the aqueous solution of dichlorotetraammine platinum to adjust the pH of the support solution to 9.6.

Catalysts A to E were the same as the catalyst pellets A in terms of their shape, average crushing strength, proportion of zirconia, proportion of alumina, proportion of sulfureous component, and pore volume of pores having a diameter of 0.002 to 10 μm. Tables 1 and 2 show the standard deviation/average value for the platinum concentration in each of Catalysts A to E, the platinum crystallite diameter measured by X-ray diffraction, the proportion of the catalyst accounted for by nitrogen, the specific surface area, the median pore diameter in a pore diameter range of 0.002 to 0.05 μm, and the sulfureous component content (as the elemental sulfur weight).

Comparative Example 2

An aqueous solution of chloroplatinic acid ($H_2PtCl_6$) was supported by spraying on 125 g of the catalyst pellets A such that the amount of platinum in the catalyst would be 0.5 wt %. This product was dried, then calcined for 0.5 hour at 680° C. to obtain approximately 125 g of Catalyst F. The diffusion and distribution of platinum in Catalyst F was not uniform, and the standard deviation/average value of platinum concentration was 0.51. Observation by scanning electron microscope revealed agglomerated particles of platinum in Catalyst F that were not seen with Catalyst A. The properties of Catalyst F are also shown in Table 2.

TABLE 1

| Catalyst | Example 1 Catalyst A | Example 2 Catalyst B | Comp. Ex. 1 Catalyst C |
|---|---|---|---|
| pH of support | 7.0 | 7.0 | 7.0 |
| Platinum concentration (wt %) | 0.5 | 0.33 | 0.11 |
| Standard deviation/average value of platinum concentration | 0.18 | 0.33 | 0.86 |
| Platinum crystallite diameter (nm) | 8.0 | 6.5 | 7.2 |
| Nitrogen content (wt %) | ≦0.01 | ≦0.01 | ≦0.01 |
| Specific surface area (m$^2$/g) | 162 | 158 | 163 |
| Median pore diameter (nm) | 5.8 | 6.0 | 5.7 |
| Sulfureous component content (wt %) | 2.8 | 2.7 | 2.7 |

TABLE 2

| Catalyst | Example 3 Catalyst D | Example 4 Catalyst E | Comp. Ex. 2 Catalyst F |
|---|---|---|---|
| pH of support | 1.8 | 9.6 | — |
| Platinum concentration (wt %) | 0.5 | 0.5 | 0.5 |
| Standard deviation/average value of platinum concentration | 0.20 | 0.24 | 0.51 |
| Platinum crystallite diameter (nm) | 7.9 | 7.9 | 40 |
| Nitrogen content (wt %) | ≦0.01 | ≦0.01 | ≦0.01 |
| Specific surface area (m$^2$/g) | 159 | 159 | 163 |
| Median pore diameter (nm) | 5.9 | 6.0 | 5.6 |
| Sulfureous component content (wt %) | 2.7 | 2.8 | 2.8 |

Figure 2:
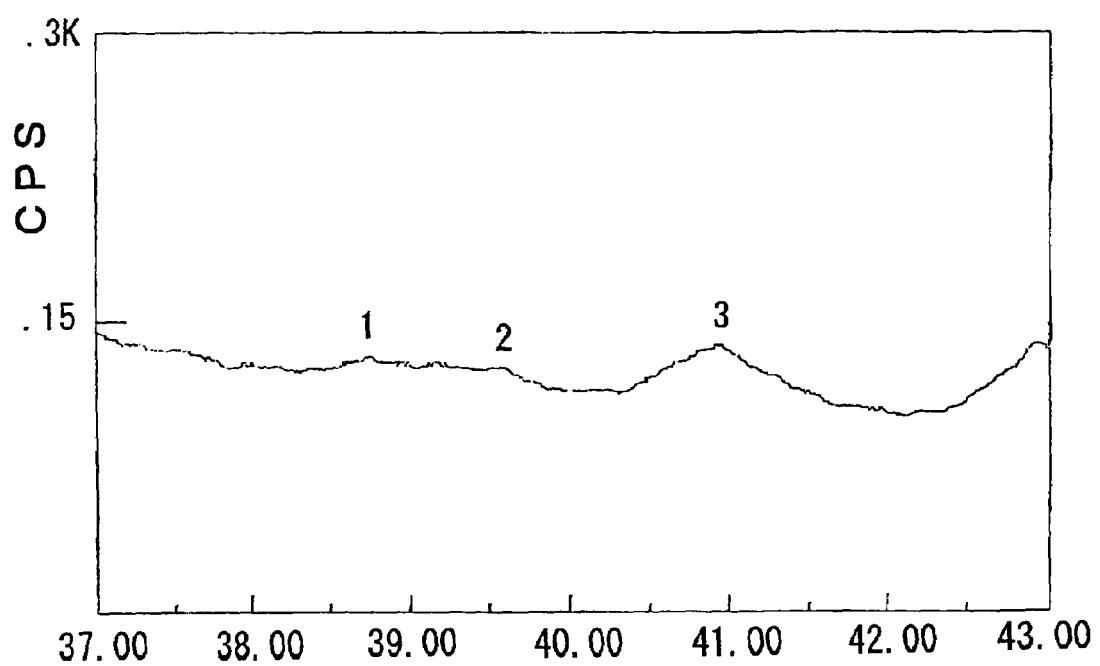
FIG. 2 is the X-ray diffraction pattern of catalyst F obtained in Comparative Example 2.
Figure 3:
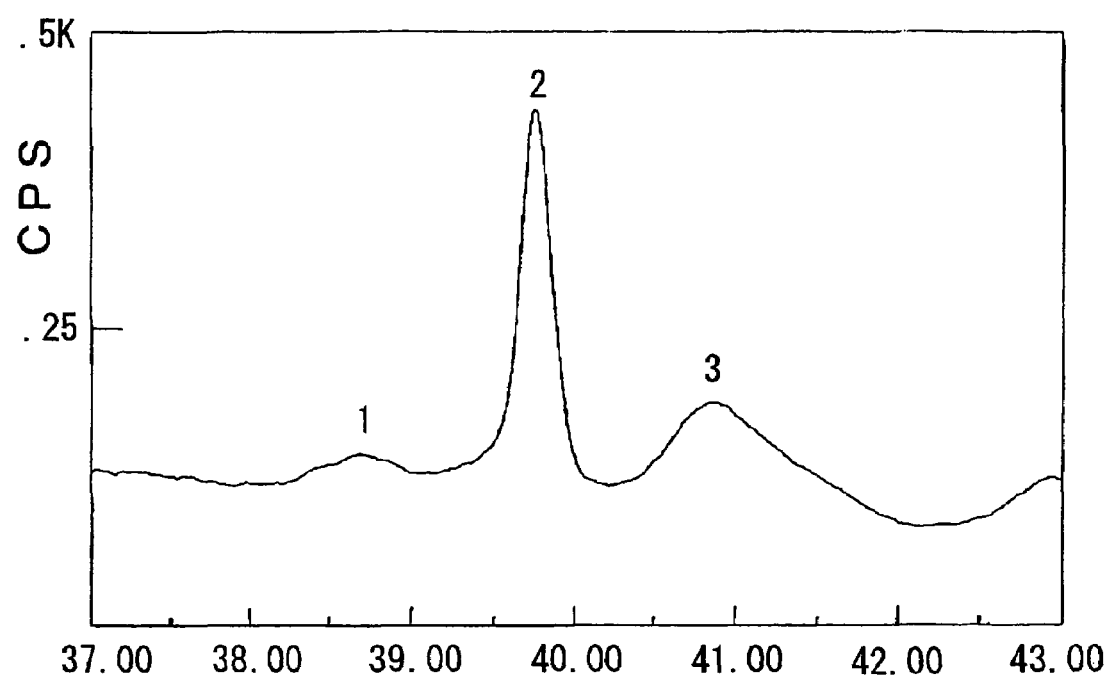
FIG. 3 is the X-ray diffraction-pattern of a standard catalyst in which the crystallinity is 100%.

The crystallinity of Catalysts A and F was measured by X-ray diffraction under the following measurement conditions. FIGS. 1 to 3 show the obtained X-ray diffraction patterns.

(1) X-ray diffraction measurement conditions: An RAD-1C X-ray diffraction apparatus made by Rigaku Denki was used.

X-ray tube; sealed copper bulb
  (tube voltage: 30 kV, tube current: 45 mA, wavelength: 0.15407 nm)

Measurement region (2θ): 37 to 43°

Scanning rate: 0.1°/minute

Step width: 0.01°

Slit width: divergent slit (DS)=1°
  scattering slit (SS)=1°
  receiving slit (RS)=0.03 mm Smoothing: 25 times (2) Diffraction peak used: the peak near 2θ=39.7° (Peaks other than the target were separated using "Crystallity (peak separation method)" application software from Rigaku Denki for an X-ray diffraction apparatus, and the peak surface area was found.

(3) Standard sample for crystallinity: This sample was prepared in the same manner as Catalyst F, except that the calcining after the supporting of the chloroplatinic acid aqueous solution was performed for 12 hours at 800° C.

The crystallinity was calculated from the peak surface area of Catalysts A and F, with the surface area of the peak near 2θ=39.7° of this standard sample corresponding to a crystallinity of 100%.

TABLE 3

|  | Peak surface area | Crystallinity | Diffraction pattern |
|---|---|---|---|
| Catalyst A | 48.17 | 66% | FIG. 1 |
| Catalyst F | 0.29 | ≦20% | FIG. 2 |
| Standard sample | 73.37 | 100% | FIG. 3 |

EXAMPLE 5 and Comparative Example 3

Light Naphtha Isomerization Reaction 4 cc of catalyst (Catalysts A and F) that had been graded to get granules passable through a 16 to 24 mesh sieve was charged into a fixed bed reactor with a length of 50 cm and an inside diameter of 1 cm, and pretreatment was followed by the isomerization of light naphtha. This pretreatment was carried out at a temperature of 400° C., at normal pressure, in an air atmosphere, for 1 hour. After this, the inside of the reactor was replaced with a nitrogen atmosphere without allowing air to enter, and the atmosphere was then changed to hydrogen, after which the isomerization reaction was commenced.

The desulfurized light naphtha used as the reaction raw material contained 5.8 wt % butane, 58.8 wt % pentane, 29.7 wt % hexane, 2.3 wt % cyclopentane, 2.6 wt % methylcyclopentane and cyclohexane, 1.0 wt % benzene, and 0.1 wt % olefin. The water content was no more than 40 weight ppm, the sulfur compound concentration was no more than 1 weight ppm (as sulfur), the nitrogen compound concentration was no more than 0.1 weight ppm (as nitrogen), the concentration of oxygen compounds other than water was no more than 0.1 weight ppm (as oxygen), and the chlorine compound concentration was no more than 0.1 weight ppm (as chlorine).

The hydrogen gas used in the reaction had a purity of 99.99 vol %, the water concentration was no more than 0.5 weight ppm, and as for other impurities, the sulfur compound concentration was no more than 1 weight ppm (as sulfur), the nitrogen compound concentration was no more than 0.1 weight ppm (as nitrogen), the concentration of oxygen compounds other than water was no more than 0.1 weight ppm (as oxygen), and the chlorine compound concentration was no more than 0.1 weight ppm (as chlorine).

The isomerization of light naphtha was carried out at a reaction temperature of 195°C., a reaction pressure (gauge pressure) of 1.96 MPa (20 kg/cm$^2$), an LHSV of 2/hr, and a hydrogen/oil ratio (H$_2$/oil) of 2 (mol/mol). 200 hours after the start of oil flow, the reaction tube outlet composition was analyzed by gas chromatography. Table 4 shows the reaction tube outlet composition (analysis results). iC5/ΣC5 in Table 4 is the proportion (wt %) of isopentane in the fraction of C$_5$ straight-chain hydrocarbons, and 2,2'-DMB/ΣC6 is the proportion (wt %) of 2,2'-dimethylbutane in the fraction of C$_6$ straight-chain hydrocarbons. The i-C5/ΣC5 of the desulfurized light naphtha used as the reaction raw material was 40.1 wt %, and the 2,2'DMB/ΣC6 was 1.4 wt %.

TABLE 4

|  | Catalyst | i-C5/ΣC5 | 2,2'-DMB/ΣC6 |
|---|---|---|---|
| Example 5 | Catalyst A | 73.4 wt % | 26.3 wt % |
| Comp. Ex. 3 | Catalyst F | 73.1 wt % | 25.0 wt % |

EXAMPLES 6 to 9 and Comparative Examples 4 and 5 n-Hexane Isomerization Reaction

The reaction raw material consisted of either raw material 1 (100 wt % n-hexane) or raw material 2 (a mixture of 6 wt % benzene and 94 wt % n-hexane). The water concentration was no more than 40 weight ppm, the sulfur compound concentration was no more than 1 weight ppm (as sulfur), the nitrogen compound concentration was no more than 0.1 weight ppm (as nitrogen), the concentration of oxygen compounds other than water was no more than 0.1 weight ppm (as oxygen), and the chlorine compound concentration was no more than 0.1 weight ppm (as chlorine).

The isomerization of n-hexane was carried out at a reaction temperature of 180° C., a reaction pressure (gauge pressure) of 0.98 MPa, an LHSV of 1.5/hr, and a hydrogen/ oil ratio (H$_2$/oil) of 5 (mol/mol). 70 hours after the start of oil flow, the composition at the reaction tube outlet was analyzed by gas chromatography. The rest of the reaction conditions were the same as in the isomerization of light naphtha.

Table 5 shows the n-hexane conversion when Catalysts A, B, C and F were used, and the amount (wt %) of 2,2'-dimethylbutane contained in the saturated hydrocarbons having six carbon atoms in the reaction product. The benzene conversion was roughly 100%. The conversion was the same in all of the reactions in which just n-hexane was isomerized, but when benzene was contained, it can be seen that the conversion decreased depending on the supporting method and the amount of platinum supported.

TABLE 5

|  | Catalyst | Platinum content (wt %) | Raw material 1: 100 wt % n-hexane | | Raw material 2: 6 wt % benzene, 94 wt % n-hexane | |
|---|---|---|---|---|---|---|
|  |  |  | Conversion (wt %) | 2,2'-DMB/ C6p (wt %) | Conversion (wt %) | 2,2'-DMB/ C6p (wt %) |
| Ex. 6 | Catalyst A | 0.5 | 85 | 17.0 | 80 | 12.5 |
| Ex. 7 | Catalyst B | 0.33 | 85 | 16.5 | 80 | 12.1 |

TABLE 5-continued

| | Catalyst | Platinum content (wt %) | Raw material 1: 100 wt % n-hexane | | Raw material 2: 6 wt % benzene, 94 wt % n-hexane | |
|---|---|---|---|---|---|---|
| | | | Conversion (wt %) | 2,2'-DMB/ C6p (wt %) | Conversion (wt %) | 2,2'-DMB/ C6p (wt %) |
| C. E. 4 | Catalyst C | 0.11 | 85 | 17.4 | 58 | 3.2 |
| C. E. 5 | Catalyst F | 0.5 | 85 | 17.6 | 67 | 4.6 |

[C. E.: Comparative Example]

Table 6 shows the amount (wt %) of the 2,2'-dimethylbutane contained in the saturated hydrocarbons having six carbon atoms in the n-hexane reaction product when Catalysts D and E were used, along with the results for Example 6. There is a slight decrease in the amount contained when the pH of the support solution is not near neutral.

TABLE 6

| | Catalyst | pH of support solution | 22 DMB/C6p n-C6 100% |
|---|---|---|---|
| Example 6 | Catalyst A | 7.0 | 17.0 |
| Example 8 | Catalyst D | 1.8 | 15.0 |
| Example 9 | Catalyst E | 9.6 | 15.1 |

Industrial Applicability

When catalyst pellets impregnated with chloroplatinic acid, which forms a platinum group metal anion, is used as a platinum group metal support solution, the capillary action of pores of the porous support causes the concentration of platinum group metal to be higher in the center portion of the pellets, but the subsequent calcining results in considerable local variance in the concentration of the platinum group metal. The reason for this seems to be that there is no interaction between the anions and the acidic activity point within the catalyst pellets, so the concentration distribution of the platinum group metal tends to vary during drying and calcining. With the present invention, when the platinum group metal is used as a cation in impregnation, it selectively reaches the acidic activity point within the catalyst pellets, and the platinum group metal concentration becomes higher around the outer part of the catalyst. Drying and calcining then result in a uniform distribution of the platinum group metal. This uniform support of the platinum group metal increases catalyst activity.

What is claimed is:

1. A shaped solid acid catalyst that comprises porous catalyst pellets exhibiting solid acid characteristics, a platinum group metal component contained and supported by the catalyst pellets in an amount of at least 0.15 wt. % by using a support solution containing a platinum group metal as a cation, in which a quotient of dividing a standard deviation of concentration in the platinum group metal component concentration distribution in said catalyst by an average concentration is 0.4 or less and wherein the catalyst pellets are composed of a shaped support consisting of a metal oxide, and a sulfureous component supported by the support.

2. The solid acid catalyst according to claim 1, wherein the platinum group metal component has been crystallized.

3. The solid acid catalyst according to claim 1, wherein a metal component of the metal oxide is at least one selected from the group consisting of aluminum, titanium, iron, zirconium and tin.

4. The solid acid catalyst according to claim 3, wherein the metal component of the support includes zirconium and aluminum, and the zirconium and the aluminum are contained in the catalyst in an amount of 20 to 72 wt % as elemental zirconium weight and in an amount of 5 to 30 wt % as elemental aluminum weight, respectively.

5. The solid acid catalyst according to claim 1, wherein the acidcatalyzed reaction is an isomerization reaction of a hydrocarbon containing at least 70 wt % of a saturated hydrocarbon component having 4 to 10 carbon atoms.

6. The solid acid catalyst according to claim 5, wherein the acid-catalyzed reaction is an isomerization reaction of a hydrocarbon containing at least 0.5 wt % benzene.

7. A method for isomerizing a hydrocarbon, wherein a hydrocarbon including at least 70 wt % of a saturated hydrocarbon component having 4 to 10 carbon atoms is brought into contact with the solid acid catalyst according to claim 1.

8. The isomerization method according to claim 7, wherein the hydrocarbon contains at least 0.5 wt % benzene.

9. The solid acid catalyst according to claim 1, wherein the support solution contains an ammine complex of a platinum group metal.

10. The solid acid catalyst according to claim 9, wherein the support solution contains dichlorotetraammine platinum.

11. A method for preparing a solid acid catalyst, comprising a step of preparing crystalline porous catalyst pellets by supporting a sulfureous component onto a shaped support consisting of a metal oxide, a step of preparing a support solution containing a platinum group metal as a cation, and a step of impregnating the crystalline, porous catalyst pellets exhibiting solid acid characteristics with the support solution so that the platinum group metal component concentration in the catalyst is at least 0.15 wt. %, a quotient of dividing a standard deviation of concentration in a platinum group metal component concentration distribution in said catalyst by an average concentration is 0.4 or less.

12. The method for preparing a solid acid catalyst according to claim 11, wherein the platinum group metal component is crystallized.

13. The method for preparing a solid acid catalyst according to claim 11, wherein the metal component of the support includes zirconium and aluminum, and the zirconium and the aluminum are contained in the catalyst in an amount of 20 to 72 wt % as elemental zirconium weight and in an amount of 5 to 30 wt % as elemental aluminum weight.

14. The method forpreparing a solid acid catalyst according to claim 11, wherein the support solution contains an ammine complex of a platinum group metal.

15. The method of preparing a solid acid catalyst according to claim 14, wherein the support solution contains dichlorotetraammine platinum.

16. The method for preparing a solid acid catalyst according to claim 11 wherein the pH of the support solution is 5 to 8.

* * * * *